United States Patent Office 2,838,192
Patented June 10, 1958

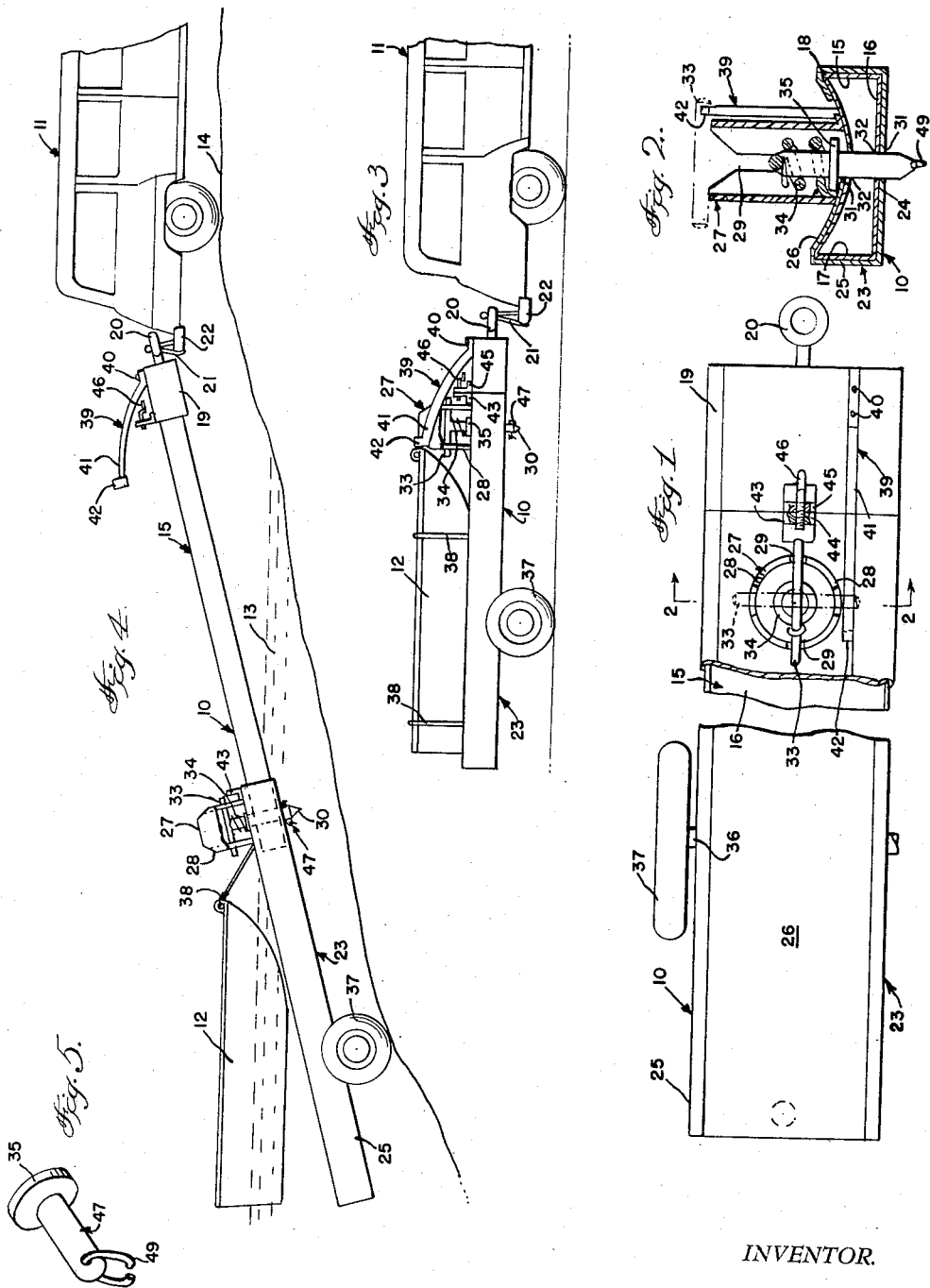

2,838,192

EXTENSIBLE TRAILER

Mike Dzvonik, Whitaker, Pa.

Application July 18, 1957, Serial No. 672,643

3 Claims. (Cl. 214—506)

This invention relates to a trailer, and more particularly to a boat trailer.

The object of the invention is to provide a boat trailer which is extensible or adjustable so that the job of launching a boat from the trailer or the task of removing the boat from water is greatly facilitated.

Another object of the invention is to provide an extensible or adjustable boat trailer which includes inner and outer sections or frame members that are telescopically connected together, and wherein there is provided a means for maintaining the frames immobile in their adjusted positions.

A further object of the invention is to provide an extensible boat trailer which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a fragmentary top plan view showing the boat trailer of the present invention, and with parts broken away and in section.

Figure 2 is a sectional view taken on the line 2—2 of Figure 1.

Figure 3 is a side elevational view showing the boat trailer attached to a towing vehicle, and showing the frame members or sections in retracted position.

Figure 4 is a view similar to Figure 3, but showing the frame members in adjusted or extended position.

Figure 5 is a perspective view showing the safety pin.

Referring in detail to the drawings, the numeral 10 designates the extensible boat trailer of the present invention which is adapted to be towed or moved by means of a towing vehicle 11. The trailer 10 is adapted to be used for launching a boat or removing a boat such as the boat 12 from the water 13, and the handling of the boat 12 can be accomplished with the vehicle 11 on the land 14 a convenient distance away from the water 13 as for example as shown in Figure 4.

The boat trailer 10 includes an inner frame 15 which includes a bottom wall 16 and a pair of upstanding spaced parallel side walls 17, and the inner frame 15 further includes an arcuate or curved top wall 18.

Arranged on the front end of the inner frame 15 and secured thereto or formed integral therewith is a support portion 19, and extending forwardly from the inner frame 15 and secured thereto is a hook 20 which is adapted to be connected to the rear bumper 22 of the vehicle 11, through the medium of a clamp 21.

The trailer 10 further includes an outer frame 23 which is telescopically or adjustably connected to the inner frame 15, and the outer frame 23 has substantially the same shape as the inner frame 15 except that the outer frame 23 is larger than the inner frame 15. The outer frame 23 includes a bottom wall 24, upstanding side walls 25 and an arcuate top wall 26 which defines a saddle for receiving the boat 12 as for example when the boat 12 is being transported or moved.

The numeral 27 indicates a body member which extends upwardly from the front end of the outer frame 23 and is secured thereto, and the body member 27 includes a pair of arcuate side sections 28 which are spaced apart to define therebetween diametrically opposed slots 29. The numeral 30 indicates a vertically adjustable or movable locking pin which is mounted for movement into and out of engagement with openings 31 and 32 in the outer frame 23 and inner frame 15.

Secured to the upper end of the pin 30 is a bar or handle 33, and the bar 33 is arranged at right angles with respect to the pin 30. A coil spring 34 is circumposed on the pin 30, and the upper portion of the coil spring 34 is connected to the bar 33, while the lower end of the spring 34 is secured as by welding, to the top wall 26 of the frame 23. The spring 34 engages a collar 35 which is mounted on the pin 30, and the spring 34 serves to normally urge the pin 30 downwardly into locking position.

The numeral 36 indicates an axle which is mounted below the trailer, and the usual wheels 37 are mounted on the axle 36 so that the trailer can be readily moved from place to place as desired. The boat 12 is adapted to be connected to the trailer through the medium of cables or ropes 38.

The numeral 39 indicates a trip lever which has an end thereof secured to the support member 19 through the medium of securing elements 40, and the trip lever 39 includes an inclined portion 41 which terminates in an upstanding finger 42. The finger 42 is adapted to selectively engage the bar 33 when the bar 33 is resting on the upper ends of the sections 28 so that the bar 33 will be moved from the broken line position shown in Figure 1 to the solid line position shown in Figure 1 so that the locking pin 30 can be automatically tripped when desired.

A means is provided for releasably locking the frame 23 in the position shown in Figure 3, as for example when the boat 12 is being moved from place to place. This last named means comprises a lug 43 which extends upwardly from the front of the frame 23 and which is secured thereto, and the lug 43 is provided with a threaded opening 44. A second lug 45 is secured to the support member 19, and a manually operable crank or screw member 46 extends through the lug 45 for engaging the opening 44 in the lug 43. Thus, by properly rotating the screw member 46, the screw member can be brought into engagement with the threaded opening 44 so as to lock the outer frame 25 in the position shown in Figure 3. When the parts are to be moved to the position shown in Figure 4, the screw member 46 can be rotated in the opposite direction so as to free the screw member 46 from the opening 44 whereby the outer frame 23 can be moved outwardly along the inner frame 15.

From the foregoing, it is apparent that there has been provided an extensible boat trailer which will facilitate the launching of boats or removal of boats from the water. In use, when the boat 12 is being moved from one location to another, the parts are in the position shown in Figure 3. Thus, it will be seen that with the parts in the position of Figure 3, the outer frame 23 is arranged forwardly on the inner frame 15 so that the front end of the frame 23 abuts the support member 19. The frame 23 is held in this position by means of the screw member 46 which extends through the lug 45 and into engagement with the opening 44 in the lug 43. The boat 12 is fastened to the frame 23 through the medium of cables or ropes 38. When the parts are in the position shown in Figure 3, the locking pin 30 extends through the openings 31 and 32 in the frames whereby the frame 23 cannot move rearwardly on the frame 15. A safety pin 47 is adapted to be extended through a suitable opening in the lower end of the locking pin 30 so as to prevent accidental upward movement of the locking pin 30, and as shown in Figure 5 the safety pin 47 includes a head 48 on one end thereof. A compressible clasp 49 is carried by the pin 47 so that when the pin 47 is inserted through the opening in the pin 30, the clasp 49 can be readily compressed.

When it is desired to launch boat 12 in the water, then the vehicle 11 is backed up on the ground 14 to a position contiguous to the water 13 but since the trailer 10 is extensible or adjustable as to length, then it is not necessary to move the towing vehicle 11 into the water whereby the possibility of the vehicle becoming stuck is eliminated. To extend the trailer 10 from the position shown in Figure 3 to the position shown in Figure 4, it is only necessary to manually compress the clasp 49 whereby the safety pin 47 can be removed from the lower end of the locking pin 30. Then, the handle or bar 33 is manually gripped and this bar 33 is lifted up through the slot 29 in the body member 27 and this bar 33 is turned transversely or at right angles from the solid line position shown in Figure 1 to the broken line position shown in Figure 1 whereby the bar 33 can rest on top of the sections 28. This will keep the lower end of the pin 30 above the openings 31 and 32 whereby the frame 25 can be manually moved outwardly along the frame 15. As the frame 25 starts to move outwardly, the finger 42 on the trip bar 39 will engage the end of the bar 33 so that the bar 33 will be moved from the broken line position of Figure 1 to the solid line position shown in Figure 1 whereby the coil spring 34 will pull the bar 33 down into registry with the slots 29. Thus, when the outer frame 25 reaches its outermost extended position as shown in Figure 4, the lower end of the locking pin 30 can be moved downwardly through registering openings in the inner and outer frames, by means of the coil spring 34 so that the parts will be locked in the position shown in Figure 4.

As previously described, with the parts in the position shown in Figure 1 or 3, the screw member 46 engages the lug 43 so as to provide an additional safety lock for the trailer, and when the parts are to be moved to the position shown in Figure 4, the screw member 46 is removed from the opening 44 so as to permit the parts to extend.

When the frame 25 is to be returned from the position shown in Figure 4 to the position shown in Figure 3, for example, then the bar 33 is again manually lifted and this bar 33 is raised vertically and moved 90 degrees by hand so that it rests on top of the sections 28. Then, the frame 25 is pushed onto the frame 15 and as the frames come together, the finger 42 will again engage the transversely extending bar 33 to move the bar 33 into a position so that it registers with the slots 29 whereby when the openings 31 and 32 register, the lower pointed end of the locking pin 30 can extend through these openings 31 and 32 and the spring 34 will maintain the locking pin in locking engagement with these openings.

Thus, it will be seen that there is provided a means whereby the effective length of the trailer can be extended or adjusted as desired and wherein there is provided a means for automatically operating the locking pin as the trailer is moved to extended or retracted position. By means of the extensible trailer, it will be seen that when the boat is to be launched or removed from the water, the extensible arrangement shown in Figure 4 permits the boat to be handled without the necessity of the vehicle 11 being in the water or near the water so that the chance of the vehicle being stuck in the water or in the mud is greatly reduced or eliminated. When the boat 12 is being towed or moved from place to place, the parts are in the position shown in Figure 3 and the cables 38 connect the boat 12 to the trailer frame.

With the present invention, the boat can be readily launched in the water without the necessity of having the boat scraping on the ground so that damage to the boat will be prevented. Also, the trailer will facilitate the launching of boats in localities which are usually inaccessible such as locations which do not have a ramp or the like. Also, damage to the vehicle from water, mud and the like will be prevented so that the vehicle 11 can be kept in good shape. The vehicle 11 does not have to back up into the water since the trailer 10 can be extended as shown in Figure 4 when the trailer is being used for launching or removing the boat 12. Thus, the trailer 11 will not get stuck in the sand or mud and the boat is easily launched by means of the previously described construction. Thus, with the parts in the position as shown in Figure 4 the boat 12 can be readily floated onto or off of the frame 23 of the trailer 10. The main locking pin 30 is automatically moved into the proper position as the parts are adjusted.

When the parts are in the position shown in Figure 3, the boat 12 can be readily moved or pulled along a highway by means of the vehicle 11. The parts can be made of any suitable material and in different shapes or sizes. When the water is reached or the place where the boat is to be launched, the effective length of the trailer can be extended so that the boat can be easily and quickly launched as previously described. When the boat is to be launched, the pin 30 is raised by means of the bar 33 and this bar 33 is moved 90 degrees so as to temporarily retain the pin 30 in raised position. This will permit the outer frame to telescope or slide off of the inner frame and then the bar 33 will be engaged by the finger 42 on the trip lever 39 so that when the parts are in their extended position, the pin 30 will again be pulled downwardly into locking position, so that the boat is ready to be launched. When the boat is being removed from the water, the boat can be tied to the frame 25 and then the parts can be moved to the position shown in Figure 3 so that the boat is ready to be moved to the next location. The frame 25 can be readily manually moved. Since the trailer is only of a relatively short length when the trailer is being moved along a highway, there will be no interference with normal movement of the boat from place to place.

While I have shown a preferred form of my invention, I reserve all rights to such modifications as properly fall within the scope of the invention as claimed.

I claim:

1. In a boat trailer, an inner frame, an enlarged support member arranged on the front end of said inner frame, a hook extending forwardly from said inner frame for engagement with a towing vehicle, a trip lever having its lower end secured to said support member and said trip lever including an inclined portion terminating in an upstanding finger, an outer frame slidably surrounding said inner frame and having substantially the same configuration in cross section as said inner frame, a body member extending upwardly from the front of the outer frame and including a pair of arcuate sections defining diametrically opposed slots therebetween, there being registering openings in said inner and outer frames, a vertically movable locking pin mounted for movement into and out of engagement with said openings, a transverse bar on the upper end of said pin for selective engagement with the finger of said trip lever, and a coil spring surrounding said pin and having its upper end connected to said bar.

2. In a boat trailer, an inner frame, an enlarged support member arranged on the front end of said inner frame, a hook extending forwardly from said inner frame for engagement with a towing vehicle, a trip lever having its lower end secured to said support member and said trip lever including an inclined portion terminating in an upstanding finger, an outer frame slidably surrounding said inner frame and having substantially the same configuration in cross section as said inner frame, a body member extending upwardly from the front of the outer frame and including a pair of arcuate sections defining diametrically opposed slots therebetween, there being registering openings in said inner and outer frames, a vertically movable locking pin mounted for movement into and out of engagement with said openings, a transverse bar on the upper end of said pin for selective engagement with the finger of said trip lever, and a coil spring surrounding said pin and having its upper end connected to said bar, a lug extending upwardly from said support member, a lug extending upwardly from said outer frame, and a screw member for connecting said lugs together.

3. In a boat trailer, an inner frame, an enlarged support member arranged on the front end of said inner frame, a hook extending forwardly from said inner frame for engagement with a towing vehicle, a trip lever having its lower end secured to said support member and said trip lever including an inclined portion terminating in an upstanding finger, an outer frame slidably surrounding said inner frame and having substantially the same configuration in cross section as said inner frame, a body member extending upwardly from the front of the outer frame and including a pair of arcuate sections defining diametrically opposed slots therebetween, there being registering openings in said inner and outer frames, a vertically movable locking pin mounted for movement into and out of engagement with said openings, a transverse bar on the upper end of said pin for selective engagement with the finger of said trip lever, a coil spring surrounding said pin and having its upper end connected to said bar, a lug extending upwardly from said support member, a lug extending upwardly from said outer frame, a screw member for connecting said lugs together, and a safety pin for releasably engaging the lower end of said locking pin.

References Cited in the file of this patent
UNITED STATES PATENTS 2,720,413     Halverson     Oct. 11, 1955